United States Patent Office 3,452,466
Patented July 1, 1969

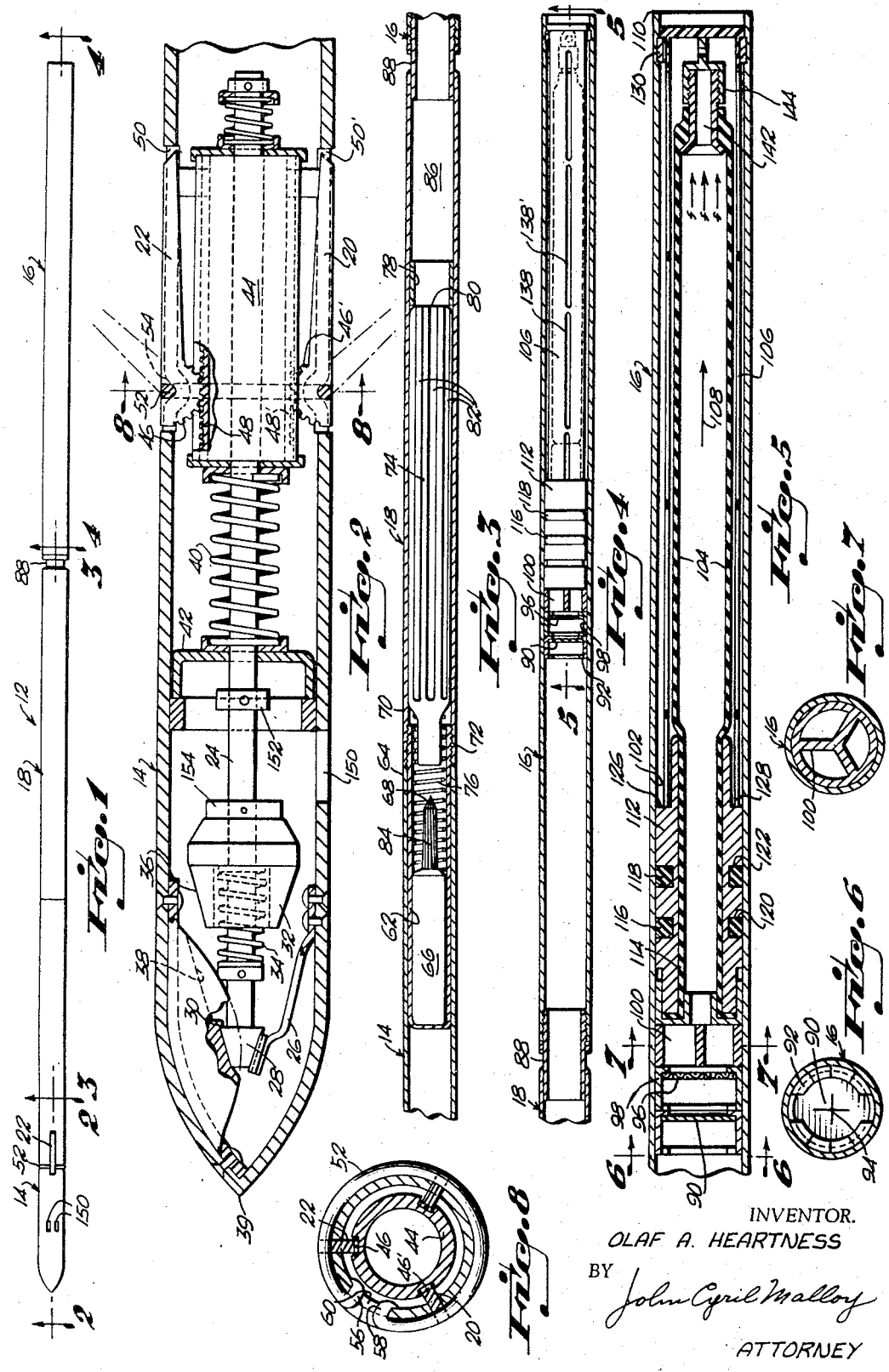

3,452,466
INERTIA ACTUATED INFLATABLE UNDER-
WATER SPEAR
Olaf A. Heartness, 2312 SW. 10 St., Miami, Fla. 33135
Filed Mar. 6, 1968, Ser. No. 710,799
Int. Cl. A01k *81/04, 93/00*
U.S. Cl. 43—6                                    10 Claims

ABSTRACT OF THE DISCLOSURE

An underwater spear which includes a casing having arranged on its exterior surfaces a plurality of prongs and a mechanism within the casing effective to rotate the prongs outwardly of the spear surface into a common angle of divergence with the spear on impact with an object and a balloon carried in the spear in open fluid communication with a chamber including a capsule of compressed fluid and a pin adapted to impact upon the capsule on a rapid change of velocity of the spear, as when fired, so that the compressed fluid will inflate the balloon, irrespective of whether the spear strikes an object or not, and inflates the same to add drag to the spear and raise it to the surface for recovery.

---

In the past, there have been numerous types of spears which have been used for underwater fishing; and this invention is of an improved type of spear which includes retractable prongs carried on the exterior of the spear body which are adapted to be rotated into an operative position only on impact, and which spear also includes a balloon adapted to be inflated irrespective of whether the spear strikes an object or not for causing the spear to rise to the surface for a ready location and easy recovery of it.

It is, accordingly, an object of this invention to provide a spear for use in underwater fishing which includes an inertia actuated prong mechanism and an inflatable balloon.

It is another object of this invention to provide an improved spear characterized by a plurality of prongs adapted to be rotated into operative position on impact of the spear on an object but which otherwise does not impede the movement of the spear through the water.

It is also an object of this invention to provide a mechanism arranged in the spear to actuate the prongs on impact of the spear, which mechanism is of an inertia actuated type which releases a spring to cause the spear prongs to rotate into an operative position on impact.

It is another object of this invention to provide an improved spear for use in underwater fishing which includes prongs and a balloon assembly within the spear in sealing relation of the chamber and which balloon assembly includes a balloon opening towards a capsule of compressed fluid within the spear which is adapted to be released when fired on the consequent change in velocity so that the balloon will become inflated and cause the spear to rise to the surface for a ready recovery of it.

It is another object of this invention to provide an improved spear which is simple in construction, inexpensive to manufacture, and is well adapted for use in underwater fishing and which includes an inertia actuated prong mechanism and a balloon system to be inflated irrespective of whether or not the spear impacts upon an object.

In accordance with these and other objects which will become apparent hereinafter, the instant invention will now be described with reference to the accompanying drawings in which:

FIGURE 1 is a side view of the spear;

FIGURE 2 is a view in cross section taken along the plane indicated by the line 2—2 of FIGURE 1 and looking in the direction of the arrows;

FIGURE 3 is a view in cross section taken along the plane indicated by the line 3—3 of FIGURE 1 and looking in the direction of the arrows;

FIGURE 4 is a view in cross section taken along the plane indicated by the line 4—4 of FIGURE 1 and looking in the direction of the arrows;

FIGURE 5 is a view in cross section taken along the plane indicated by the line 5—5 of FIGURE 4 and looking in the direction of the arrows;

FIGURE 6 is a view in cross section taken along the plane indicated by the line 6—6 of FIGURE 5 and looking in the direction of the arrows;

FIGURE 7 is a view in cross section taken along the plane indicated by the line 7—7 of FIGURE 5 and looking in the direction of the arrows; and FIGURE 8 is a view in cross section taken along the line 8—8 of FIGURE 2 and looking in the direction of the arrows.

Referring to the drawings, wherein like reference characters designate like or corresponding parts throughout the different views, and referring particularly to FIGURE 1, there is shown a spear generally designated by the numeral 12 which is composed of a leading casing or portion 14, also seen in FIGURE 2, a trailing casing or portion 16, also seen in FIGURE 5, and an intermediate casing or portion 18, also seen in FIGURE 3. These portions are interconnected by suitable means, and in each there is embodied a separate operating mechanism. In the first portion 14 a mechanism is housed for operating retractable spear prongs such as 20 and 22, which are preferably three in number and arranged symmetrically with respect to the longitudinal center line of the spear 12.

Referring to the retractable spear prong mechanism, it is seen that it includes a slide bar 24 generally held in coaxial relation with the spear by means of a leaf spring or keeper 26 at the forward edge which normally holds the cone-shaped end 28 in engagement with a latch 30. On the rod a weight 32 is slidably arranged and held away from the latch 30 by means of a spring 34. The sliding weight is provided with a surface 36 companionately configured for engagement with a mating surface 38 on the latch. This is so that on impact of the tip 39 of the portion or casing 14 as the spear hits an object, the surface 36 of the sliding weight 32, which will travel forwardly, will engage the surface 38 to unseat the end from the latch 30, that is the conical body 28 will be slightly deflected against the spring pressure of the keeper 26. In this manner the energy stored in a main retractable coiled prong release spring 40 circumposed about the rod will be released to act on the end fixed by the keeper ring 42 secured to the casing of the forward portion 14 to cause a cylindrical gear rack 44, against which the spring normally exerts a force tending toward rearward movement, to move rearwardly. In so doing, a plurality of gear teeth such as 46 and 46′ which are in engagement with the rack surface 48, 48′ rotate the retractable spear prongs out of snug flush engagement in the longitudinally aligned mounting slots 50 and 50′ about a center of rotation defined by an annular ring 52 securely nestled within a slot 54 in the casing and secured by inwardly turned ends 56 and 58 within an opening 60, as seen in FIGURE 8. In operation, this mechanism is adapted to rotate the retractable spear prongs into the dotted line position on impact without deleteriously slowing the path of the spear through water.

Referring to FIGURE 3 and FIGURE 4, there is shown an arrangement of structure adapted to inflate a balloon carried in the spear so that whether or not it impacts upon an object such as a fish it will be inflated, rise to the surface and act as a float to locate the spear. As seen in FIGURE 3, a cup-shaped member 62 is secured in the end 64 of the casing portion 14 in which dwells a moveable striker pin 66 with a rearwardly facing, pointed terminal end 68. Within the adjacent end 70 of the portion 18 which is secured to the portion 14 by suitable means such as the screw threads 72, there is secured a frangible capsule 74 of compressed fluid which is held in spaced relation from the point 68 by a resistance spring 76 at one end and by a locater ring 78 for the bottom 80 of the capsule. The exterior surface of the capsule is provided with longitudinal flutes 82 which extend the full length of the capsule and provide a rearward path from the chamber defined between the striker pin member 66 and the capsule, so that on firing from a spear gun the pin will be driven into the capsule. The pin is fluted similarly to the capsule along the length thereof, as indicated by the numeral 84, to release the compressed fluid which travels slowly but persistently rearwardly, since that is the only path available. It will be apparent that a pressure will be built up in the chamber 86 rearwardly of the capsule which leads to the rearward portion 16 through a connector joint 88. In the rearward portion there is provided a frangible disk 90 to cause delay in any transmission of fluid due to its increase in pressure to the aftermost portion of the spear. However, as the pressure in the chamber 86 continues to build it will rupture the disk 90, seen in FIGURE 6, which spans a carrier 92, the central portion of the disk being weakened as indicated by the right-angularly arranged score lines 94. On rupture, the fluid will pass through a strainer or screen material 96 in an annular seat 98 and past a division grill 100 and into the expansion chamber 102 in the rearward portion 16. The gases will tend to expand a balloon 104 within the chamber 102. The balloon is secured within a tubular housing 106 and, responsive to the increase in pressure, is free for only one direction of expansion and that is rearwardly in the direction of the arrow 108. Continued pressure will cause the balloon as well as the tubular housing 106 to move outwardly of the terminal end 110 of the portion 16. It will be seen in FIGURE 5 that the movement is in the nature of a movement by a piston composed of an end 112 which is snugly received within the chamber 102 and circumposed about the inner end 114 of the balloon with suitable sealing rings 116 and 118 being provided in seats 120 and 122 so that the entire piston will move the tubular housing 106 rearwardly in the direction shown by the arrow 108 in response to the pressure forces indicated by the arrows $f$ the end 112 having a shoulder 126 which bears against the adjacent end 128 of the tubular housing 106. The rearward motion of the entire piston assembly will not be arrested until the shoulder 126 engages a snap ring 130 secured interiorly in the end 110 of the portion 16, that is when the tubular housing extends outwardly of the end. Continued buildup of pressure caused by the release of the compressed fluid in the capsule will thereafter not be free to move the balloon piston assembly rearwardly and will tend to exert a radial bursting force equally in all directions. This will have the effect of rupturing the tubular housing 106 which is longitudinally weakened as indicated by the slots 138, 138' which are interconnected only by a small portion. The result will be that any increases in pressure will lead to and reach a bursting force level upon the tubular housing 106 with the result that after a time delay caused by the aforesaid structure, the balloon will be freed from the tubular housing 106 to expand and slowly cause the spear to rise to the surface together with any fish that has been struck thereby. To the end of the balloon a member 142 is secured which has a threaded distal end on which a cap 144 is secured to be removed to deflate the balloon.

The spear may be reused by repositioning a balloon in the tubular housing 106 and moving it forwardly with the piston within the rearward portion, inserting another compressed fluid capsule within the intermediate portion removing the ruptured disk and installing a replacement, and by recocking the retractable spear prong mechanism using a tool to move the slide rod forward into the seated position shown in FIGURE 2 which may be effected by the use of a special tool inserted into the opening 150 which is provided so that the end of the tool may manipulate an enlarged portion 152 or 154 on the slide bar, the portion 152 acting as a stop to limit rearward movement of the bar on engagement with the keeper ring 42.

While the instant invention has been shown and described herein in what is conceived to be the most practical and preferred embodiment, it is recognized that departures may be made therefrom within the scope of the invention.

What is claimed is:

1. A spear having a leading end and a trailing end comprising:
    an elongate casing including a leading, a trailing, and an intermediate interconnected portion;
    a plurality of prongs normally nested in smooth relation on the leading portion and means in the leading portion interengaging the prongs and effective to rotate the trailing ends of the prongs outwardly of the spear surface into a common angle of divergence with the spear on impact;
    said intermediate and trailing portions defining a chamber, a frangible capsule of compressed fluid and a pin mounted for relative movement in said chamber in close axially spaced relation with respect to one another and means to prohibit rearward movement of the capsule so that on a rapid change of velocity of the spear the pin will strike and break the capsule to release the compressed fluid into the chamber to increase the pressure therein, and
    a balloon assembly in said chamber in sealing relation of said trailing end, said balloon assembly including a balloon opening toward said capsule and means responsive to said increase in pressure in the chamber to move the assembly so that the balloon extends from the trailing end and is inflated by the compressed fluid to add drag to the spear for recovery of it.

2. The improved device as set forth in claim 1 wherein said means in the leading portion includes a rod in co-cylindrical relation with said spear and weight means movably mounted thereon,
    biasing means to normally urge said rod from a cocked position to a released position,
    keeper means to hold said rod in said cocked position,
    said rod including a gear rack and each of said spear prongs including a gear having teeth in meshed relation with said gear rack,
    said weight means being effective on impact of the spear to release said keeper so that said biasing means will move the rack relative to the prong gears to rotate the prongs into said angle of divergence with the spear.

3. The improvement as set forth in claim 2 wherein said means responsive to said increase in pressure includes a piston head circumposed about said balloon opening and sealing means about said head and a tubular jacket circumposed about said balloon and coaxial with said spear so that on expansion of the gases in the chamber the balloon assembly will move rearwardly, and stop means to limit rearward movement of the balloon assembly when the tubular member projects from the trailing end of said spear.

4. The improvement as set forth in claim 3 wherein said tubular jacket is longitudinally weakened so that when it projects from the end of the spear and the balloon inflates, it is adapted to burst to free the balloon for expansion in all directions and to rise to the surface.

5. The improvement as set forth in claim 1 wherein a disk is provided intermediate said capsule and said balloon assembly in spanning relation of said chamber to separate the chamber into two portions, said disk being sized and constructed to burst on an increase of pressure beyond a predetermined level in the portion of the chamber containing the capsule to permit an increase of pressure in the portion of the chamber including said balloon assembly.

6. The improvement as set forth in claim 5 wherein a screen means is provided in combination with said disk.

7. The improvement as set forth in claim 1 wherein said means responsive to said increase in pressure includes a piston head circumposed about said balloon opening and sealing means about said head and a tubular jacket circumposed about said balloon and coaxial with said spear so that on expansion of the gases in the chamber the balloon assembly will move rearwardly, and stop means to limit rearward movement of the balloon assembly when the tubular member projects from the trailing end of said spear.

8. The improvement as set forth in claim 7 wherein said tubular jacket is longitudinally weakened so that when it projects from the end of the spear and the balloon inflates, it is adapted to burst to free the balloon for expansion in all directions and to rise to the surface.

9. The device as set forth in claim 7 wherein a disk is provided intermediate said capsule and said balloon assembly in spanning relation of said chamber to separate the chamber into two portions, said disk being sized and constructed to burst on an increase of pressure beyond a predetermined level in the portion of the chamber containing the capsule to permit an increase of pressure in the portion of the chamber including said balloon assembly.

10. The improvement as set forth in claim 9 wherein a screen means is provided in combination with said disk.

References Cited

UNITED STATES PATENTS

| | | | |
|---|---|---|---|
| 2,642,693 | 6/1953 | Broady | 43—23 |
| 2,703,944 | 3/1955 | Molyneux | 43—6 |
| 2,853,724 | 9/1958 | Smith | 43—23 X |
| 3,153,875 | 10/1964 | Califano | 43—6 |
| 3,210,880 | 10/1965 | Grenier | 43—6 |
| 3,340,642 | 9/1967 | Vasiljevic | 43—6 |

WARNER H. CAMP, *Primary Examiner.*